No. 769,646. PATENTED SEPT. 6, 1904.
F. E. CASE.
CONNECTION BOX.
APPLICATION FILED FEB. 20, 1903.
NO MODEL.

WITNESSES:
Harry N. Tilden.
Helen Orford

INVENTOR:
Frank E. Case.
by Albert G. Davis
Atty.

No. 769,646. Patented September 6, 1904.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

CONNECTION-BOX.

SPECIFICATION forming part of Letters Patent No 769,646, dated September 6, 1904.

Application filed February 20, 1903. Serial No. 144,183. (No model.)

*To all whom it may concern:*

Be it known that I, FRANK E. CASE, a citizen of the United States, residing at Schenectady, in the county of Schenectady, State of New York, have invented certain new and useful Improvements in Connection-Boxes, of which the following is a specification.

My invention relates to improvements in connection-boxes, and more especially to such connection-boxes as are used in train-control systems for the purpose of connecting the corresponding train-wires together or to the proper leads to the controllers and motors.

In train-control systems and in other similar systems which employ a plurality of conductors bound together in the form of a cable it is often desirable to connect the corresponding conductors of one cable to those of another cable and to have the connection-points easily accessible and interchangeable and also to have the said connections thoroughly protected from injury due to accidental or intentional contact with some foreign object. It is also desirable to have the system in which the plurality of conductors are used of a flexible nature—that is, to have the connection-box so constructed and arranged as to receive any desired number of cable ends and to contain binding-posts for the purpose of connecting the corresponding conductors in said cables together.

The object of my invention is to produce an efficient and inexpensive connection-box which will be adapted for use in a system employing a plurality of cables and at the same time provide perfect protection for the cable ends and connections independent of the number of cables used in the system.

My invention therefore consists of a connection-box preferably made of insulating material and containing binding-posts which are adapted to connect together the corresponding wires of the cables entering an adjustable opening in one side of said connection-box and also of means, preferably interchangeable blocks each corresponding in size to a single cable, for filling up the part of said adjustable opening not occupied by the incoming cables.

Figure 1:
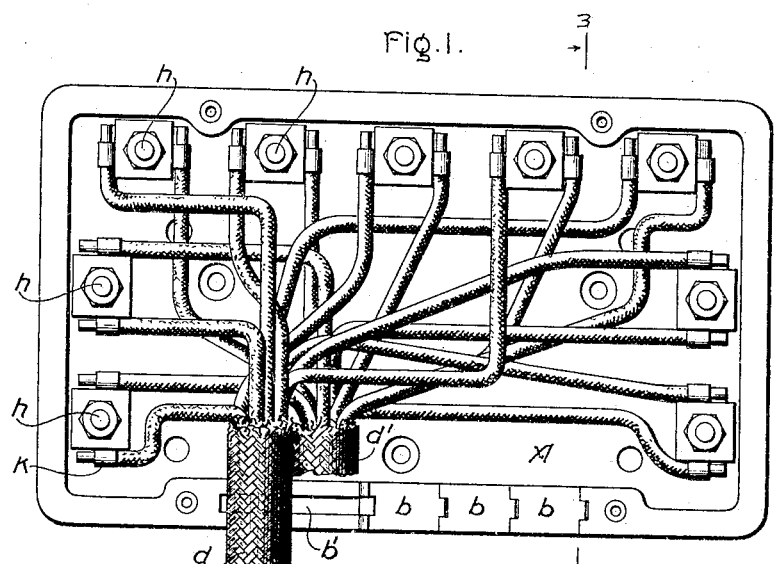
Figure 2:
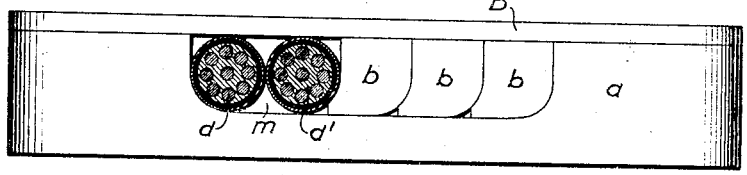
Figure 3:
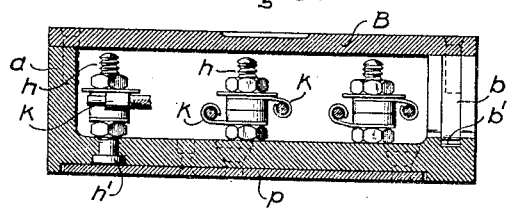
Figure 4:
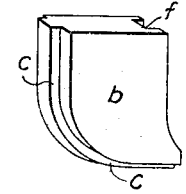

In the accompanying drawings, which illustrate the preferred embodiment of my invention, Figure 1 is a plan view of the connection-box with the cover removed, showing the connections which are adapted to be made between the corresponding wires of two nine-wire cables. Fig. 2 is a side elevation of the said box with the cover in its proper position. Fig. 3 is a section through the box shown in Fig. 1 on the line 3 3, and Fig. 4 is a perspective view of one of the interchangeable blocks.

Referring now to the drawings, A represents the bottom of the box, said bottom being preferably molded integrally with the sides $a$. Fastened to the bottom A and inserted from the under side thereof are the binding-posts $h$, arranged within the box in any desired manner.

In the box shown in Fig. 1 I have indicated my preferred arrangement for nine binding-posts which are adapted to receive and connect together electrically the terminals $k$ on the corresponding conductors of the incoming cables $d$ and $d'$.

One side of the connection-box is cut away at $m$, as is clearly shown in Fig. 2, so as to accommodate five nine-wire cables. It will be clearly understood that the number of cables entering the cut-away portion or opening in the side $a$ of the box is not limited to any specific number. For the purpose of clearness in illustrating the connections between the corresponding wires of the cables and also for the purpose of illustrating the relative position and location of a plurality of filler-blocks I have shown but two cables entering the connection-box. The said cut-away portion or opening $m$ above referred to is provided with a groove $b'$, into which the bottom part of the tongue $c$ of each of the filler-blocks $b$ is adapted to enter. The tongue $c$ also extends up on one side of said filler-block and the opposite side of said block is provided with a groove $f$, which is adapted to receive the tongue $c$ of the next adjacent block when said blocks are in position in the opening $m$, as shown in Figs. 1 and 2. The said filler-blocks $b$ have the function of acting as substitutes for the cables which have been omitted and also acting as means for maintaining rigidly in position the cables which enter the connection-box, thereby preventing movement of the same. The connection-box is also provided with a cover B, which acts to protect the binding-posts and terminals above referred to and also acts as means for maintaining the filler-blocks *b* in their proper position, so that the tongue *c* will register with the grooves *f* and *b'*. The filler-blocks *b* may be held in position by other means, if so desired. In order to protect the under side of the box from contact with anything that is likely to make electrical connection with the heads *h'* of the binding-posts, the under part of the box is provided with an insulating strip or cover *p*.

The connection-box may be made of insulating material, which is preferably molded into the form desired, the size and shape of said box being determined by the number of cables which enter the box and also by the number of conductors in each cable.

What I claim as new, and desire to secure by Letters Patent of the United States, is—

1. A connection-box provided with an opening large enough to receive a plurality of cable ends, and a plurality of filler-blocks filling that part of the opening not occupied by the cable ends.

2. A connection-box provided with an opening large enough to receive a plurality of cable ends, a plurality of filler-blocks filling that part of the opening not occupied by the cable ends, and means for holding said blocks in position in the opening.

3. A connection-box provided with an opening large enough to receive a plurality of cable ends, a plurality of filler-blocks filling that part of the opening not occupied by the cable ends, and a removable cover so constructed and arranged that when fastened in position on said box it assists in holding said blocks in position in the side opening.

4. A connection-box of molded material having an adjustable opening through which cables or conductors are adapted to pass, a plurality of binding-posts fastened to the bottom of said box, and a plurality of interchangeable filler-blocks filling the part of said opening not occupied by said cables or conductors.

5. A connection-box of molded insulating material having its bottom and its sides formed integral one of said sides being formed with an opening for the reception of any desired number of cable ends, and interchangeable blocks each of a width equal to the diameter of one of the cable ends occupying the part of said opening not filled with the incoming cables.

6. A connection-box for the train-wires in a train-control system having a plurality of blocks for varying the size of an opening in said box to adapt it to receive any desired number of cables containing said train-wires or conductors which are to be connected with said train-wires, each block taking the place of an omitted cable.

In witness whereof I have hereunto set my hand this 18th day of February, 1903.

FRANK E. CASE.

Witnesses:
BENJAMIN B. HULL,
HELEN ORFORD.